(12) United States Patent
Nicaise

(10) Patent No.: US 10,792,732 B2
(45) Date of Patent: Oct. 6, 2020

(54) MOBILE MULTI-HOUSING ADDITIVE MANUFACTURING INSTALLATION

(71) Applicant: AddUp, Cebazat (FR)

(72) Inventor: Jean-Pierre Nicaise, Cebazat (FR)

(73) Assignee: AddUp, Cebazat (FR)

(*) Notice: Subject to any disclaimer, the term of this patent is extended or adjusted under 35 U.S.C. 154(b) by 204 days.

(21) Appl. No.: 16/066,748

(22) PCT Filed: Oct. 12, 2017

(86) PCT No.: PCT/EP2017/076072
§ 371 (c)(1),
(2) Date: Jun. 28, 2018

(87) PCT Pub. No.: WO2018/069447
PCT Pub. Date: Apr. 19, 2018

(65) Prior Publication Data
US 2019/0009337 A1 Jan. 10, 2019

(30) Foreign Application Priority Data

Oct. 13, 2016 (FR) ..................................... 16 59897

(51) Int. Cl.
*B29C 67/00* (2017.01)
*B22F 3/105* (2006.01)
(Continued)

(52) U.S. Cl.
CPC .......... *B22F 3/1055* (2013.01); *B29C 64/153* (2017.08); *B29C 64/20* (2017.08);
(Continued)

(58) Field of Classification Search
CPC ... B29C 64/153; B29C 64/386; B29C 64/393; B33Y 30/00; B33Y 50/02
See application file for complete search history.

(56) References Cited

U.S. PATENT DOCUMENTS

| 6,940,037 | B1 | 9/2005 | Kovacevic et al. |
| 2004/0003738 | A1 | 1/2004 | Imiolek et al. |

(Continued)

FOREIGN PATENT DOCUMENTS

DE 9002744 U1 9/1990

OTHER PUBLICATIONS

Pending U.S. Appl. No. 16/066,743, filed Oct. 12, 2017.
(Continued)

*Primary Examiner* — Joseph S Del Sole
*Assistant Examiner* — Thu Khanh T Nguyen
(74) *Attorney, Agent, or Firm* — Venable LLP

(57) ABSTRACT

A mobile additive manufacturing installation (10) comprises a main self-supporting frame (12), a main manufacturing housing (14), at least one main additive manufacturing machine (M1) installed inside the main manufacturing housing, a main inerting device (26), a main circulation path and a main airlock (34). The mobile installation also comprises at least one auxiliary manufacturing housing connected to the main manufacturing housing (14), at least one auxiliary additive manufacturing machine (M2, M3) being installed in this auxiliary manufacturing housing, an auxiliary self-supporting frame (112) supporting this auxiliary manufacturing housing and independent of the main self-supporting frame (12), and an auxiliary circulation path (132) being provided in the auxiliary manufacturing housing.

16 Claims, 3 Drawing Sheets

(51) Int. Cl.
  *B33Y 30/00* (2015.01)
  *B33Y 40/00* (2020.01)
  *B29C 64/20* (2017.01)
  *B29C 64/153* (2017.01)
  *B29C 64/25* (2017.01)

(52) U.S. Cl.
  CPC .............. *B29C 64/25* (2017.08); *B33Y 30/00* (2014.12); *B33Y 40/00* (2014.12); *B22F 2003/1056* (2013.01); *Y02P 10/295* (2015.11)

(56) References Cited

U.S. PATENT DOCUMENTS

| | | |
|---|---|---|
| 2004/0003741 A1 | 1/2004 | Iskra et al. |
| 2004/0004303 A1 | 1/2004 | Iskra |
| 2004/0004653 A1 | 1/2004 | Pryor et al. |
| 2004/0005182 A1 | 1/2004 | Gaylo et al. |
| 2004/0118309 A1 | 6/2004 | Fedor et al. |
| 2012/0077429 A1 | 3/2012 | Wernimont et al. |
| 2013/0109291 A1 | 5/2013 | Holtz et al. |
| 2014/0374935 A1* | 12/2014 | Flitsch ................ B29C 64/386 264/40.1 |
| 2016/0229005 A1 | 8/2016 | Ryan et al. |
| 2017/0334134 A1* | 11/2017 | Herzog ................ B29C 64/153 |

OTHER PUBLICATIONS

S. Moylan et al., "Lessons Learned in Establishing the NIST Metal Additive Manufacturing Laboratory", Jun. 1, 2013 (retrieved from http://nvlpubs.nist.gov/nistpubs/TechnicalNotes/NIST.TN.1801.pdf on Jun. 28, 2017).

C. Seifarth, "CassaMobile_second_public_workshop_presentation_Stuttgart", Aug. 24, 2016 (retrieved from http://www.cassamobile.eu/dissemination/second_workshop/index.php on Jun. 30, 2017).

* cited by examiner

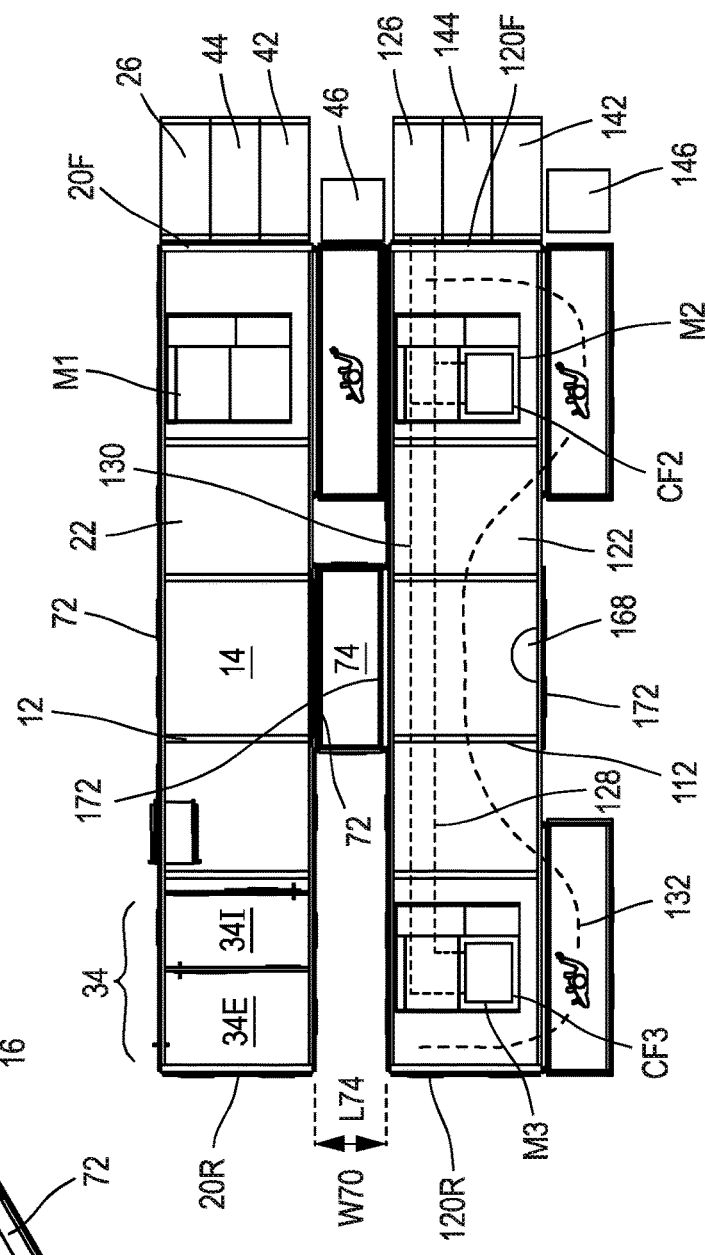
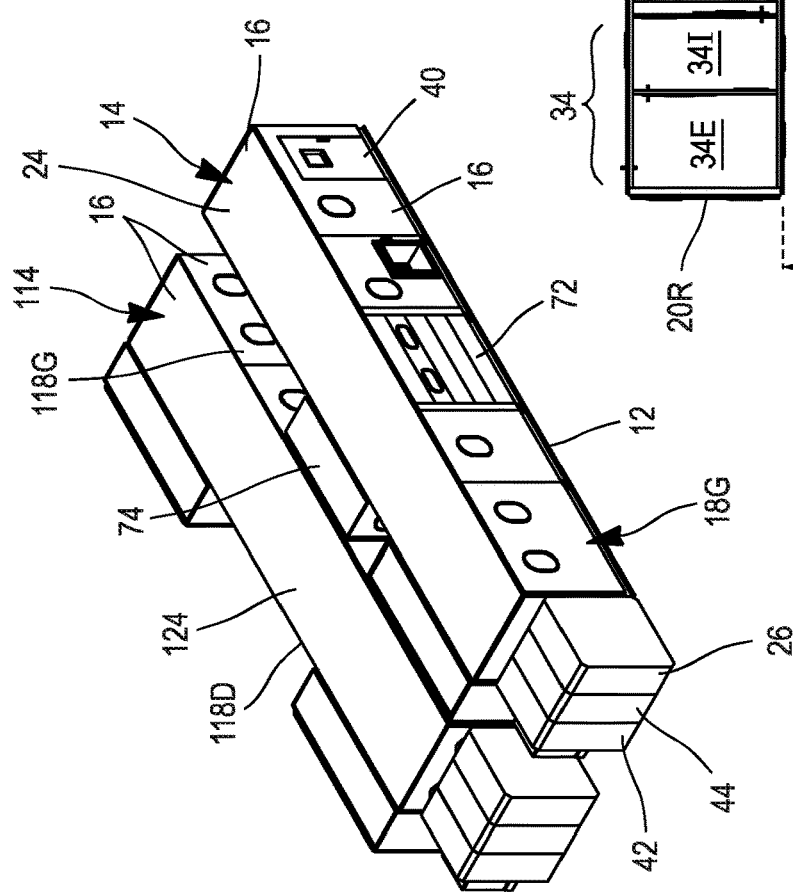

MOBILE MULTI-HOUSING ADDITIVE MANUFACTURING INSTALLATION

BACKGROUND

The invention falls within the field of powder-based additive manufacturing by fusing grains of this powder using a source of energy or of heat, such as a laser beam, a beam of electrons, or diodes, for example.

More specifically, the invention is targeted at facilitating access to additive manufacturing processes.

Currently, an increasing number of industrial sectors are becoming interested in additive manufacturing; mention may in particular be made of the aeronautical industry, the motor vehicle industry, the watchmaking industry, the nuclear industry, and the like. This is because additive manufacturing processes allow the manufacture of parts which cannot be produced, or else with difficulty, with conventional manufacturing methods, which are moulding and machining for metal parts or injection moulding for polymer-based materials.

Consequently, there exist, on the market, various manufacturers providing various additive manufacturing machines capable of meeting industrial requirements.

To date, research and development efforts have mainly concentrated on the productivity of the additive manufacturing machines for the purpose of reducing the operating cost of these machines and the cost price of the parts manufactured.

However, there exists a barrier with which industrialists wishing to use additive manufacturing are confronted today: the safety of additive manufacturing plants and more particularly the safety of the personnel required to work on additive manufacturing machines and in their immediate environment.

This is because additive manufacturing powders exhibit various dangers.

On the one hand, some additive manufacturing powders may contain chemical elements which are allergenic or even toxic. For example, some metallic additive manufacturing powders may contain chemical elements such as nickel or cobalt.

Subsequently, the melting of the powder grains releases fumes containing gases toxic to man.

Consequently, in order to overcome the abovementioned risks in a simple manner, additive manufacturing powders are generally stored and transported to the additive manufacturing machines in sealed containers, and the manufacturing chambers of the additive manufacturing machines are closed housings.

In addition to the abovementioned risks, some additive manufacturing powders exhibit the disadvantage of oxidizing on contact with the oxygen present in the atmosphere.

Consequently, in order to avoid such an oxidation, the manufacturing chambers of additive manufacturing machines are filled with an inert gas, such as nitrogen or argon.

This inerting of the additive manufacturing chambers may prove to be dangerous to the personnel located nearby. This is because, in the event of leakage, the inert gas will gradually replace the oxygen and bring about the asphyxiation of the personnel located nearby.

Consequently, it is an objective of the present invention to meet the abovementioned industrial requirements while guaranteeing an optimum safety level for the personnel required to operate on additive manufacturing machines and in their immediate environment.

SUMMARY

To this end, a subject-matter of the invention is a mobile additive manufacturing installation, the installation comprising a main self-supporting frame which makes it possible to render the installation transportable by road, the installation comprising a main manufacturing housing supported by the main frame and closed in leaktight fashion by panels fixed to the main frame, at least one main additive manufacturing machine being installed inside the main manufacturing housing, the main additive manufacturing machine comprising at least one manufacturing chamber inside which is carried out an additive manufacturing process consisting in depositing additive manufacturing powder and in fusing the grains of this powder using a source of energy or of heat, the installation comprising a main inerting device which makes it possible to supply the manufacturing chamber of the machine with an inert gas and which also makes it possible to capture the inert gas contaminated by the fumes resulting from the additive manufacturing inside the manufacturing housing, a main circulation path being provided in the main manufacturing housing in order to make it possible for an operator to circulate around the main additive manufacturing machine, the installation comprising a main airlock for the entry and the exit of at least one operator, and this main airlock being supported by the main frame and closed in leaktight fashion by panels fixed to the main self-supporting frame, an internal door makes it possible for an operator to circulate between the main airlock and the main manufacturing housing and an external door makes it possible for an operator to circulate between the main airlock and the outside of the installation, the mobile installation comprising at least one auxiliary manufacturing housing connected in leaktight fashion to the main manufacturing housing, at least one auxiliary additive manufacturing machine being installed inside this auxiliary manufacturing housing, the mobile installation comprising an auxiliary self-supporting frame which supports this auxiliary manufacturing housing and which is independent of the main self-supporting frame, this auxiliary manufacturing housing being closed in leaktight fashion by panels fixed to the auxiliary self-supporting frame, an auxiliary circulation path being provided in the auxiliary manufacturing housing in order to make it possible for an operator to circulate around each auxiliary manufacturing machine installed in this auxiliary manufacturing housing.

BRIEF DESCRIPTION OF THE DRAWINGS

Other characteristics and advantages of the invention will become apparent in the description which will follow. This description, given by way of example and without limitation, refers to the drawings appended as an annex, in which:

FIG. 4 is a perspective view of a "multi-housing" fourth alternative embodiment of the mobile additive manufacturing installation according to the invention, and FIG. 5 is a top view of a "multi-housing" fourth alternative embodiment of the mobile additive manufacturing installation according to the invention.

DETAILED DESCRIPTION

Figure 1:
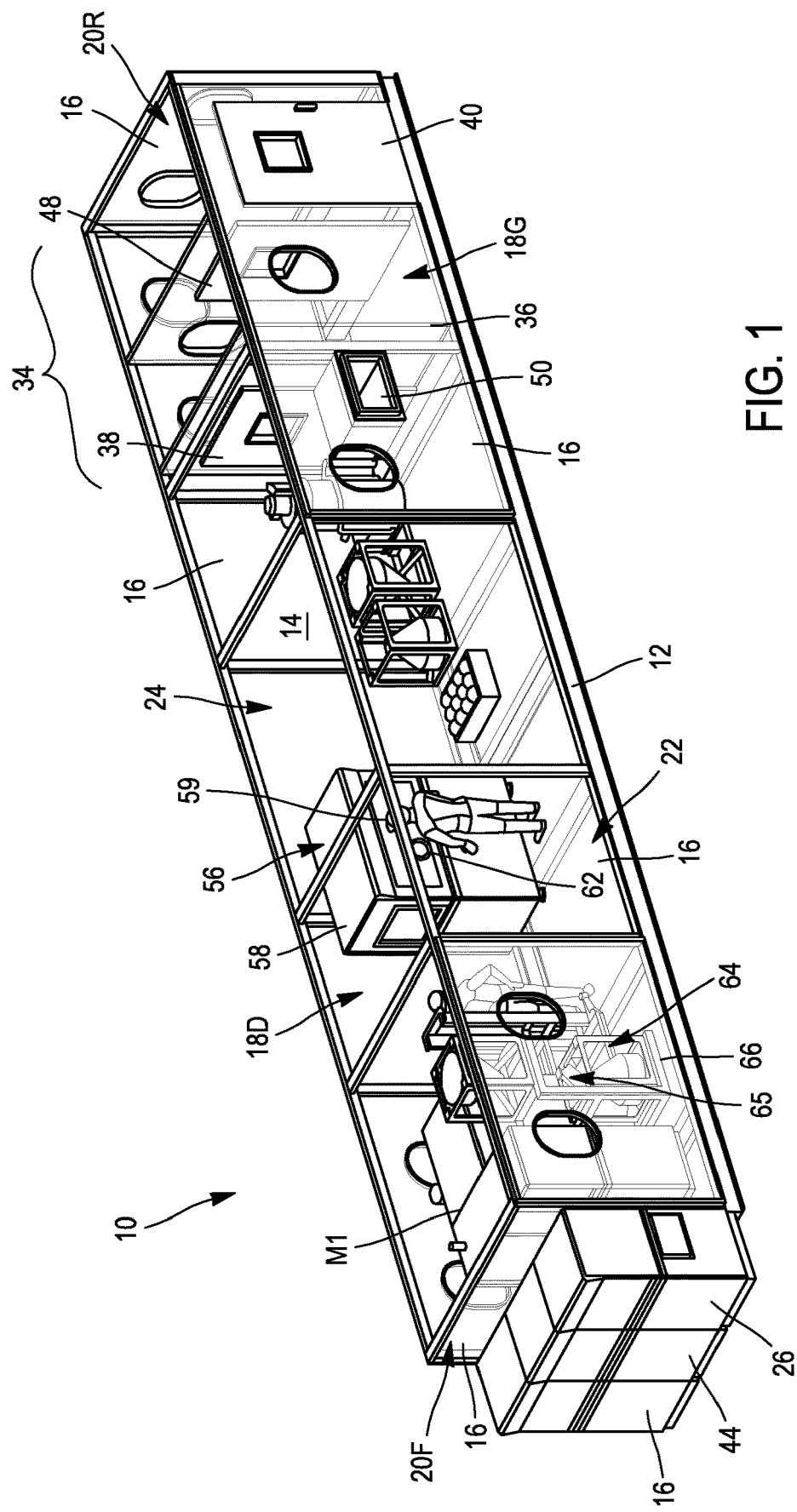
FIG. 1 is a transparent perspective representation of a second alternative embodiment of the mobile additive manufacturing installation according to the invention.

The invention relates to a mobile additive manufacturing installation 10 as is, for example, illustrated transparently in FIG. 1.

In order to be able to transport the installation 10 by road, the installation 10 comprises a main self-supporting frame 12 and a main manufacturing housing 14 supported by the main frame 12 and closed in leaktight manner by panels 16 fixed to the main frame 12, the panels 16 being transparent in FIG. 1 in order to make it possible to display the interior of the manufacturing housing.

More specifically, the installation 10 and the main manufacturing housing 14 take the form of a parallelepipedal housing with left-hand 18G and right-hand 18D side walls, front 20F and rear 20R end walls, a floor 22 and a roof 24; the panels 16 are used to close these different left-hand 18G and right-hand 18D, front 20F and rear 20R walls, and also the floor 22 and the roof 24.

The panels 16 are substantially watertight and airtight in order to prevent any dangerous leakage of gas, of powder or of liquid towards the environment external to the installation.

Preferably, the panels 16 are flame retardant.

As the invention relates to a mobile additive manufacturing installation, at least one main additive manufacturing machine M1 is installed inside the main manufacturing housing 14.

This main additive manufacturing machine M1 comprises at least one manufacturing chamber inside which is carried out an additive manufacturing process consisting in depositing additive manufacturing powder and in fusing the grains of this powder using a source of energy or of heat, such as a laser beam, a beam of electrons, or diodes, for example.

Mention may be made, among the different processes which can be employed inside a machine M1 installed in a installation 10 according to the invention, of the additive manufacturing processes by powder bed deposition, by point powder deposition, by deposition of powder along a predetermined path, by the "directed energy deposition" technique, consisting in depositing a powder using a nozzle and in solidifying it at the outlet of the nozzle using a source of energy or of heat, or by deposition of powder by spraying.

For the purpose of rendering inert the manufacturing chamber of the main machine M1, the installation 10 comprises a main inerting device 26 which makes it possible to supply the manufacturing chamber of the main machine M1 with an inert gas, such as nitrogen or argon. Furthermore, this main inerting device 26 also makes it possible to capture the fumes resulting from the additive manufacturing inside the manufacturing chamber. Finally, the main inerting device 26 makes it possible to filter the fumes in order to be able to reinject the inert gas inside the manufacturing chamber of the machine M1, thus making possible economic use of the inert gas in a closed cycle.

Preferably, the filters used to trap the particles of the additive manufacturing fumes are of class F9 according to the filtration standard EN779:2012 and they make it possible to trap particles with a diameter at least equal to 1 micrometer.

As other gases, such as, for example, molecular oxygen, may be present in a small amount, of the order of a few percent, in the manufacturing chamber of the main machine M1, the filtration carried out by the main inerting device 26 also makes it possible to separate the particles of the manufacturing fumes from these other gases in order for these other gases to be reinjected into the manufacturing chamber of the main machine M1.

Figure 3:
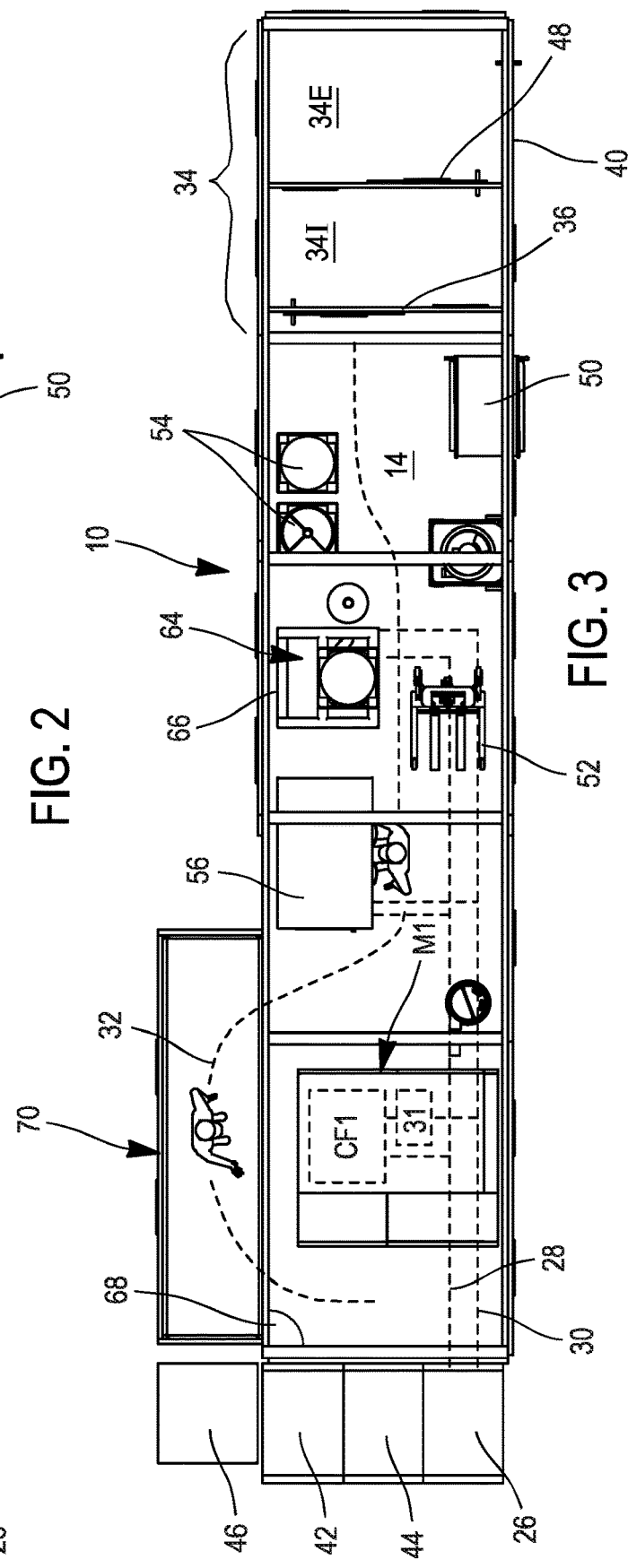
FIG. 3 is a top view of a third alternative embodiment of the mobile additive manufacturing installation according to the invention.

As is illustrated diagrammatically in FIG. 3, a first delivery pipe 28 makes it possible to conduct the inert gas, and optionally other gases, from the main inerting device 26 towards the manufacturing chamber CF1 of the main machine M1 and a second discharge pipe 30 makes it possible to conduct the fumes and a portion of the gases present in the manufacturing chamber CF1 towards the main inerting device 26.

Advantageously, a cyclone 31 present in the main machine M1 and positioned upstream of the second discharge pipe 30 makes it possible to separate the fume particles of at least five micrometers from the gas or gases extracted with the fumes from the manufacturing chamber CF1.

In addition to the filtration of the fumes, the main inerting device 26 also makes it possible to manage the pressure of the gases present inside the manufacturing chamber CF1 of the main machine M1. Thus, the main inerting device 26 makes it possible, for example, to lower the pressure of the gases present in the manufacturing chamber CF1 of the main machine M1 in order to avoid leakages of powder towards the outside of the machine.

Advantageously, the main inerting device 26 is located outside the manufacturing housing 14. Thus, the main inerting device 26 is not located in an environment subjected to the dangers of the manufacturing powders, which makes easier any human intervention on this device, such as changing the abovementioned filters or maintenance operations.

However, in order to be easily transported with the main manufacturing housing 14, the main inerting device 26 is itself also supported by the main self-supporting frame 12.

Figure 2:
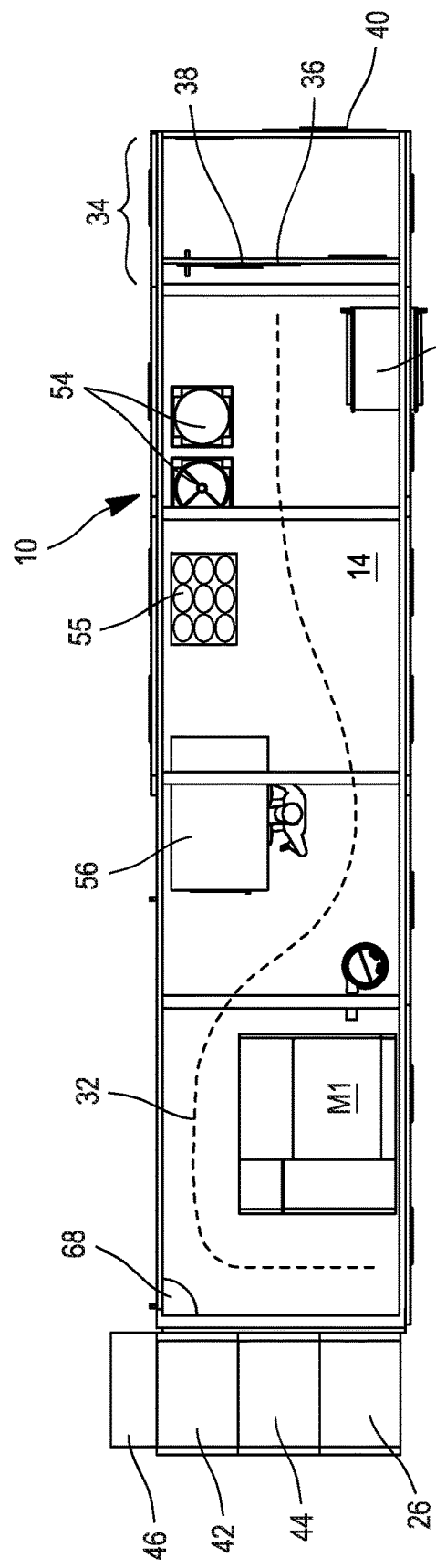
FIG. 2 is a top view of a first alternative embodiment of the mobile additive manufacturing installation according to the invention.

The installation 10 according to the invention is planned to accommodate one or more operators in the main manufacturing housing 14. As illustrated in FIG. 2, a main circulation path 32 is provided in the main manufacturing housing 14 in order to make it possible for an operator to circulate around the main additive manufacturing machine M1. Thus, the operator can charge a new additive manufacturing plate to the manufacturing chamber CF1 of the main machine M1, access the means for parameterizing the additive manufacturing cycle to be launched, and discharge the additive manufacturing plate with the part or parts manufactured.

However, due to the presence of operators in the mobile installation 10, the mobile installation comprises a main airlock 34 for the entry and the exit of at least one operator. This main airlock 34 is supported by the main frame 12 and closed in leaktight manner by panels 16 fixed to the main self-supporting frame 12. More specifically, the main airlock 34 is located in the extension of the main manufacturing housing 14 and it is isolated from this housing by a partition 36 made, for example, of panels 16. An internal door 38 makes it possible for an operator to circulate between the main airlock 34 and the main manufacturing housing 14, and an external door 40 makes it possible for an operator to circulate between the main airlock 34 and the outside of the mobile installation 10.

This main airlock 34 constitutes a first barrier to leakages of powder as it makes it possible to prevent the interior of the main manufacturing housing 14 being brought into direct communication with the outside of the installation. Advantageously, this airlock 34 is also used by the operators for putting on their items of protective equipment, such as overalls, gloves, glasses or masks with respirator, before entering the main manufacturing housing 14, and for taking off these items of equipment before exiting from the mobile installation 10.

Apart from the main airlock 34 and still in order to improve the safety of the personnel required to circulate in the area around the installation 10 and inside the main manufacturing housing 14, the installation comprises a main device 42 for treatment of the air circulating inside the main manufacturing housing 14.

First of all, this main treatment device 42 makes it possible to supply the inside of the main manufacturing housing 14 with air withdrawn outside the installation.

Subsequently, and still for the purpose of replacing the air inside the installation, this main treatment device 42 also makes it possible to withdraw the air present in the main manufacturing housing 14 and in the main airlock 34. As the air which has circulated in the manufacturing housing 14 may contain additive manufacturing powder particles, the main treatment device 42 makes it possible to filter the air captured in the main manufacturing housing 14 and in the main airlock 34 before expelling this air towards the air outside the installation. Preferably, the filters used to separate the additive manufacturing powder particles from the air captured in the main manufacturing housing 14 and in the main airlock 34 are of HEPA (High Efficiency Particulate Air) type and these filters make it possible to capture powder particles with a diameter at least equal to 0.3 micrometer.

In order to limit leakages of powder towards the outside of the installation, the main treatment device 42 also makes it possible to manage the pressure of the air present in the main manufacturing housing 14 and in the main airlock 34. More specifically, this main treatment device 42 is used to lower the pressure in the main manufacturing housing 14 and in the main airlock 34 in order to retain the powder grains and particles inside the installation. Preferably, the pressure of the air inside the main manufacturing housing 14 is less than the pressure of the air inside the main airlock 34, and the pressure of the air inside the main airlock 34 is less than the pressure of the air outside the installation.

As the use of an additive manufacturing process releases a large amount of heat, the main treatment device 42 also makes it possible to regulate, and more exactly to cool, the temperature of the air present in the main manufacturing housing 14 and in the main airlock 34.

At the same time as this temperature regulation, this main treatment device 42 also makes it possible to regulate the degree of humidity of the air present in the main manufacturing housing 14 and in the main airlock 34. This is because an excessively high degree of humidity in the main manufacturing housing 14 can lead to the presence of water in the manufacturing chamber of the main machine M1 and can harm the quality of the fusion of the powder grains and thus that of the parts manufactured. Preferably, the degree of humidity in the main manufacturing housing 14 is kept below 40%.

For the purpose of reinforcing the safety of the operators inside the main manufacturing housing 14, the main treatment device 42 also makes it possible to monitor the molecular oxygen content in the air present inside the main manufacturing housing 14. This is because, despite the leaktightness means with which the manufacturing chamber CF1 is equipped and all the possible precautions, it may happen that the inert gas introduced into the manufacturing chamber CF1 escapes from this chamber and replaces other gases, such as, for example, molecular oxygen, in the air present in the main manufacturing chamber 14. More specifically, two alarm thresholds are provided: a first alarm signal is generated when the molecular oxygen content in the air present in the main manufacturing housing 14 is less than 20%, and a second alarm signal is generated when the molecular oxygen content in the air present in the main manufacturing housing 14 is less than 18%. In practice, the first alarm threshold is preventive and indicates to the operators that they should evacuate the main manufacturing housing 14, and the second alarm signal is an alarm targeted at causing the main manufacturing housing 14, and also the environment in which the mobile installation 10 is located, to be evacuated.

Advantageously, the main treatment device 42 is located outside the manufacturing housing 14. Thus, the main treatment device 42 is not located in an environment subjected to the dangers of the manufacturing powders, which makes easier any human intervention on this device, such as changing the abovementioned filters or maintenance operations.

However, in order to be easily transported with the main manufacturing housing 14, the main treatment device 42 is itself also supported by the main self-supporting frame 12.

The different components which make it possible for the inerting device 26 and the main device 42 to perform the functions which have just been described can take various forms known to a person skilled in the art associated with each of its different functions. In particular, the means, such as pipes, ventilators, extractors and fans, which make it possible for the main device 42 to treat the air circulating in the main manufacturing housing 14 are neither represented nor described.

In order to supply the main inerting device 26 and the main treatment device 42, the main additive manufacturing machine M1, and also any other device present inside or outside the mobile installation 10 and requiring an electrical energy supply, the installation comprises a main electrical cabinet 44 bringing together the power and control circuits of the abovementioned devices and machine.

Advantageously, and like the main inerting device 26 and the main treatment device 42, the main electrical cabinet 44 is preferably located outside the main manufacturing housing 14. Thus, this main electrical cabinet 44 is not located in an environment subjected to the dangers of the manufacturing powders, which makes easier any human intervention, such as, for example, maintenance operations.

However, in order to be easily transported with the main manufacturing housing 14, the main electrical cabinet 44 is itself also supported by the main self-supporting frame 12.

More specifically, the main inerting device 26, the main treatment device 42 and the main electrical cabinet 44 take the form of three blocks placed side by side at the front of the mobile installation 10, against the front end wall 20F of the installation.

At the same time as supplying the main machine M1 with inert gas, treating the air circulating in the main manufacturing housing 14 and supplying with electrical energy, the mobile installation 10 also comprises supplying with water. This water can be used for industrial purposes, for rinsing or cleaning the parts manufactured or certain parts or components of the devices described above, and/or this water can also be used by the operators to wash or to rinse certain parts of the body liable to be exposed to powder grains, despite the items of protective equipment.

Consequently, as the water thus used can contain powder grains with toxic compounds, the mobile installation 10 comprises a main device 46 for recovery of the waste waters. This main recovery device 46 takes the form of a container which makes it possible to temporarily store the waste waters before they are recovered and treated by a specialist company.

Advantageously, the main recovery device 46 is preferably located outside the main manufacturing housing 14. This main recovery device 46 is also preferably supported by the main self-supporting frame 12.

More specifically, the main recovery device 46 takes the form of a block placed side by side with the inerting device 26, with the main treatment device 42 and with the main electrical cabinet 44 at the front of the mobile installation 10, close to the front end wall 20F of the installation.

In a first alternative embodiment of the mobile installation 10 as illustrated in FIG. 2, the main airlock 34 comprises only a single room.

However, in a second alternative embodiment illustrated by FIG. 1, the main airlock 34 comprises two rooms in communication with each other: an exterior room 34E, which is in communication with the outside of the installation 10 via the external door 40, and an interior room 34I, which is in communication with the main chamber 14 via the internal door 36, the interior room 34I communicating with the exterior room 34E via an intermediate door 48.

This twin airlock 34 is advantageous as it forms a double barrier to possible leakages of powder during the entry/exit of the operators.

Of course, the main treatment device 42 makes it possible to provide for the recycling of the air in these two rooms 34I, 34E of the main airlock 34 and to regulate its temperature and its degree of humidity.

At the same time, the main treatment device 42 also makes it possible to manage the pressure of the air in each of these two rooms 34I, 34E of the main airlock 34. Thus, preferably, the pressure of the air present in the main manufacturing housing 14 is greater than the pressure of the air present in the interior room 34I of the main airlock, the pressure of the air present in the interior room 34I of the main airlock is greater than the pressure of the air present in the exterior room 34E of the main airlock, and the pressure of the air present in the exterior room 34E of the main airlock is greater than the pressure of the air present outside the mobile installation 10.

For the entry/exit of different supplies or materials, such as, for example, batches of pots of additive manufacturing powder intended to supply the main machine M1, the mobile installation 10 comprises an auxiliary airlock 50. This auxiliary airlock has smaller dimensions than those of the main airlock 34, and it is, for example, provided through a side wall of the mobile installation, such as, for example, the left-hand side wall 18G.

In order to make the products entering and exiting from the mobile installation 10 via the auxiliary airlock 50 easier to handle, at least one handling tool 52 is provided inside the main manufacturing housing 14.

This handling tool 52 is, for example, used by an operator in order to move a container 54 intended to supply the main machine M1 with fresh powder, or in order to move another container 54 which makes it possible to recycle the powder which has already been used to supply the main machine M1 but which has not been fused.

For the purpose of protecting the operators as much as possible from exposure to additive manufacturing powder grains, the mobile installation 10 comprises a decanting device 56 comprising a housing 58 closed in leaktight fashion, at least one window 60 which makes it possible for an operator to see inside the housing 58, and glove ports 62 which make it possible for an operator to handle powder pots 55 inside the closed housing. Powder pots 55 should be understood as meaning receptacles with a smaller capacity than the containers 54 and which can be transported and handled by an operator without the handling tool 52. These powder pots 55 are leaktight containers used to store and transport the powder under a controlled and preferably inert atmosphere. This decanting device 56 and its housing 58 are used to decant, in complete safety, the fresh powder from the pots 55 into a container 54, and also to keep the powder under a controlled and preferably inert atmosphere.

Advantageously, and in order to retain the qualities of the additive manufacturing powder by introducing an inert gas, such as nitrogen or argon, therein, the housing 58 of the decanting device 56 can be connected to the inerting device 26 via the delivery pipe 28 and the discharge pipe 30. Optionally, the pipe 30 can be connected to the housing 58 of the decanting device 56 in order to remove the inert gas from the housing 58, for example when an operator has to open the housing 58 in order to introduce pots 55 therein.

At the same time as the decanting device 56, the installation 10 can also comprise a sieving device 64 which makes it possible to transfer powder from a first container 54 towards another container 54 while carrying out a sieving of this powder via a sieve 65. This sieving device 64 is used to recycle the additive manufacturing powder which has already been used to supply the main machine M1 but which has not been fused. Optionally, the sieving device 64 can also be used to sieve fresh powder. For the purpose of this sieving, the fresh powder first of all has to be decanted into a container 54, for example with the decanting device 56. Advantageously, and still for the purpose of protecting the operators, this sieving device 64 is preferably arranged inside a housing 66 closed in leaktight manner and located inside the main manufacturing housing 14.

Advantageously, and in order to retain the qualities of the additive manufacturing powder by introducing an inert gas, such as nitrogen or argon, therein, the circuit of the sieving device 64 can be connected to the inerting device 26 via the delivery pipe 28 in order to supply this circuit with inert gas. Optionally, the circuit of the sieving device 64 can also be connected to the inerting device 26 via the discharge pipe 30 in order to recover a portion of the inert gas blown into this circuit. The circuit of the sieving device 64 is formed by the container 54 of powder to be sieved, the sieve 65, the container 54 for receiving the sieved powder and the various connectors and valves located between these elements.

The decanting device 56 and the sieving device 64 are particularly important in the control of the circuit followed by the powder inside the main manufacturing housing 14 and with regard to the safety of the personnel required to work in the main manufacturing housing 14 of the mobile installation 10, or in another manufacturing housing of this installation.

In addition to the devices described above and contributing to the safety of the operators, the main treatment device 42 can comprise means making it possible to saturate the air present in the main housing 14 with an inert gas, such as nitrogen. This saturation with inert gas makes it possible to prevent a fire from starting inside the main manufacturing housing 14. Of course, this operation can only take place once all personnel have been evacuated from the main manufacturing housing 14.

In addition again, the mobile installation 10 can comprise a device 68 for spraying, in the main manufacturing housing 14, a powder which makes it possible to inhibit a fire from starting.

In a third alternative embodiment illustrated in FIG. 3 and targeted at making possible the installation, in the main manufacturing housing 14, of a main machine M1 offering greater production capacities but also exhibiting a greater bulk, the mobile installation 10 comprises a module 70 for extending the volume of the main manufacturing housing 14. This extension module 70 is self-supporting but fixed to the main self-supporting mounting 12. This extension module 70 is provided opposite the location of the main machine M1 in the main manufacturing housing 14. This extension module 70 makes it possible to widen the main manufacturing housing 14 close to the main machine M1 in order for the circulation path 32 to make it possible for an operator to circulate around the machine despite its great bulk.

With a similar objective of increasing the production capacity offered by the mobile installation 10 according to the invention, and as illustrated in FIGS. 4 and 5, the mobile installation 10 can comprise at least one auxiliary manufacturing housing 114 connected in leaktight manner to the main manufacturing housing 14, at least one auxiliary additive manufacturing machine M2 being installed inside this auxiliary manufacturing housing.

Preferably, two auxiliary additive manufacturing machines M2 and M3 are installed inside this auxiliary manufacturing housing 114. One machine is installed at the front of the auxiliary manufacturing housing 114 and the other machine is installed at the rear of the auxiliary manufacturing housing 114.

In order to support this auxiliary manufacturing housing 114, the mobile installation 10 comprises an auxiliary self-supporting frame 112 independent of the main self-supporting frame 12. Thus, this auxiliary manufacturing housing 114 can be transported by road by another vehicle than that transporting the main manufacturing housing 14.

Like the main manufacturing housing 14, the secondary manufacturing housing 114 is closed in leaktight manner by panels 16 fixed to the secondary frame.

More specifically, the secondary manufacturing housing 114 is parallelepipedal with left-hand 118G and right-hand 118D side walls, front 120F and rear 120R end walls, a floor 122 and a roof 124, the panels 16 being used to close these different left-hand 118G and right-hand 118D, front 120F and rear 120R walls, and also the floor 122 and the roof 124.

An auxiliary circulation path 132 is provided in the auxiliary manufacturing housing 114 in order to make it possible for an operator to circulate around each auxiliary manufacturing machine (M2, M3) installed in this auxiliary manufacturing housing 114.

For the purpose of connecting the two main 14 and secondary 114 housings, each of these housings comprise at least one, preferably sectional, door 72, 172, and a joining corridor 74 is installed between these two doors. This joining corridor 74 is also produced with panels 16. Leaktightness means, such as, for example, seals, are provided at the junction points between the corridor 74 and the doors 72, 172. This joining corridor 74 makes it possible for the operators to freely circulate between the main circulation path 32 of the main housing 14 and the auxiliary circulation path 132 of the auxiliary housing 114.

As it is possible for the main housing 14 to be equipped with an extension module 70, the length L74 of the joining corridor 74 is at least equal to the width W70 of the extension module 70.

Preferably, a door 72, 172 is located on a right-hand 18D, 118D or left-hand 18G, 118G side wall of its housing 14, 114. In order to make possible a flexible arrangement, each right-hand 18D, 118D and left-hand 18G, 118G side wall of each housing 14, 114 comprises a door 72, 172.

Advantageously, by providing doors 72, 172 on each side of each housing 14, 114, it is possible to connect a plurality of auxiliary manufacturing housings 114 to the main manufacturing housing. The invention, of course, covers such alternative embodiments of the mobile installation in which two, three, four, and the like, auxiliary manufacturing housings 114 are connected to a main manufacturing housing 14, and in which at least one and preferably two auxiliary additive manufacturing machine(s) are installed in each of these auxiliary manufacturing housings 114.

For the purpose of rendering inert the manufacturing chambers of the auxiliary machines M2, M3, the installation 10 comprises an auxiliary inerting device 126 which makes it possible to supply the manufacturing chambers of the auxiliary machines M2, M3 with an inert gas, such as nitrogen or argon. Furthermore, this auxiliary inerting device 126 also makes it possible to capture the fumes resulting from the additive manufacturing inside the manufacturing chambers. Finally, the auxiliary inerting device 126 makes it possible to filter the fumes in order to be able to reinject the inert gas inside the manufacturing chambers of the auxiliary machines M2, M3, thus making possible economic use of the inert gas in a closed cycle.

Preferably, the filters used to trap the particles of the additive manufacturing fumes are of class F9 according to the filtration standard EN779:2012 and they make it possible to trap particles with a diameter at least equal to 1 micrometer.

As other gases, such as, for example, molecular oxygen, may be present in a small amount, of the order of a few percent, in the manufacturing chambers of the auxiliary machines, the filtration carried out by the auxiliary inerting device 126 also makes it possible to separate the particles of the manufacturing fumes from these other gases in order for these other gases to be reinjected into the manufacturing chambers of the auxiliary machines M2, M3.

As is illustrated diagrammatically in FIG. 5, a first delivery pipe 128 makes it possible to conduct the inert gas, and optionally other gases, from the auxiliary inerting device 126 towards the manufacturing chambers CF2, CF3 of the auxiliary machines M2, M3 and a second discharge pipe 130 makes it possible to conduct the fumes and a portion of the gases present in the manufacturing chambers CF2, CF3 towards the auxiliary inerting device 126.

Advantageously, a cyclone present in each auxiliary machine M2, M3 and positioned upstream of the second discharge pipe 30 makes it possible to separate the fume particles of at least five micrometers from the gas or gases extracted with the fumes from the manufacturing chambers CF2, CF3.

In addition to the filtration of the fumes, the auxiliary inerting device 126 also makes it possible to manage the pressure of the gases present inside the manufacturing chambers CF2, CF3 of the auxiliary machines M2, M3. Thus, the auxiliary inerting device 126 makes it possible, for example, to lower the pressure of the gases present in the manufacturing chambers CF2, CF3 of the auxiliary machines M2, M3 in order to avoid leakages of powder towards the outside of the machines.

As has just been described, the auxiliary inerting device 126 is independent of the main inerting device 26. Furthermore, the auxiliary inerting device 126 is located outside the auxiliary manufacturing housing 114. Advantageously, the auxiliary inerting device 126 is supported by the auxiliary self-supporting frame 112.

In order to prevent the main device 42 for treatment of the air circulating inside the main manufacturing housing 14 from being excessively large, the installation comprises an auxiliary treatment device 142 which will assist the main treatment device 42 in the treatment of the air circulating in the different housings 14, 114.

This auxiliary treatment device 142 is independent of the main treatment device 42. This auxiliary treatment device 142 makes it possible to supply the auxiliary manufacturing housing 114, and thus the main manufacturing housing 14, with air withdrawn outside the installation.

As the air which has circulated in the housings 14, 114 may contain additive manufacturing powder particles, the auxiliary treatment device 142 makes it possible to filter the air captured before expelling this air towards the air outside the installation. Preferably, the filters used to separate the additive manufacturing powder particles from the air captured are of HEPA (High Efficiency Particulate Air) type and these filters make it possible to capture powder particles with a diameter at least equal to 0.3 micrometer.

In order to limit leakages of powder towards the outside of the installation, the auxiliary treatment device 142 also makes it possible to manage the pressure of the air present in the housings 14,114. More specifically, this auxiliary treatment device 142 is used to lower the pressure in the housings in order to retain the powder grains and particles inside the installation. Preferably, the pressure of the air inside the manufacturing housings 14,114 is less than the pressure of the air inside the main airlock 34, and the pressure of the air inside the main airlock 34 is less than the pressure of the air outside the installation.

As the use of an additive manufacturing process releases a large amount of heat, the auxiliary treatment device 142 also makes it possible to regulate, and more exactly to cool, the temperature of the air present in the manufacturing housings 14, 114 and in the main airlock 34.

At the same time as this temperature regulation, this auxiliary treatment device 142 also makes it possible to regulate the degree of humidity of the air present in the manufacturing housings 14, 114 and in the main airlock 34.

For the purpose of reinforcing the safety of the operators inside the manufacturing housings 14, 114, the auxiliary treatment device 142 also makes it possible to monitor the molecular oxygen content in the air present inside the manufacturing housings.

Advantageously, the auxiliary treatment device 142 is located outside the auxiliary manufacturing housing 114. Furthermore, the auxiliary treatment device 142 is itself also supported by the auxiliary self-supporting frame 112.

In order to supply the auxiliary inerting device 126 and the auxiliary treatment device 142, the auxiliary additive manufacturing machines M2, M3, and also any other device requiring an electrical energy supply, the installation comprises an auxiliary electrical cabinet 144 bringing together the power and control circuits of the abovementioned devices and machine. This auxiliary electrical cabinet 144 is independent of the main electrical cabinet 44.

Advantageously, and like the auxiliary inerting device 126 and the auxiliary treatment device 142, the auxiliary electrical cabinet 144 is preferably located outside the auxiliary manufacturing housing 114. Furthermore, the auxiliary electrical cabinet 144 is supported by the auxiliary self-supporting frame 112.

More specifically, the auxiliary inerting device 126, the auxiliary treatment device 142 and the auxiliary electrical cabinet 144 take the form of three blocks placed side by side at the front of the auxiliary manufacturing housing 114.

The mobile installation 10 also comprises an auxiliary device 146 for recovery of the waste waters. This recovery device 146 is independent of the main recovery device 46. This auxiliary recovery device 146 takes the form of a container which makes it possible to temporarily store the waste waters before they are recovered and treated by a specialist company.

Advantageously, the auxiliary recovery device 146 is preferably located outside the auxiliary manufacturing housing 114. This auxiliary recovery device 146 is also preferably supported by the auxiliary self-supporting frame 112.

More specifically, the auxiliary recovery device 146 takes the form of a block placed side by side with the auxiliary inerting device 126, with the auxiliary treatment device 142 and with the auxiliary electrical cabinet 144 at the front of the auxiliary manufacturing housing 114, close to the front end wall 20F of this housing.

In addition to the devices described above and contributing to the safety of the operators, the auxiliary treatment device 142 can comprise means making it possible to saturate the air present in the housings 14, 114 with an inert gas, such as nitrogen.

In addition again, the mobile installation 10 can comprise a device 168 for spraying, in the auxiliary manufacturing housing 114, a powder which makes it possible to inhibit a fire from starting.

In addition, the mobile installation 10 can also comprise one or more auxiliary modules 170 for extending the volume of the auxiliary manufacturing housing 114. Each auxiliary extension module 170 is self-supporting but fixed to the auxiliary self-supporting mounting 112. An auxiliary extension module 170 is provided opposite the location of each auxiliary machine M2, M3 in the auxiliary manufacturing housing 114. Each auxiliary extension module 170 makes it possible to widen the auxiliary manufacturing housing 114 close to an auxiliary machine M2, M3 in order for the auxiliary circulation path 132 to make it possible for an operator to circulate around these machines despite their great bulk.

The invention claimed is:

1. A mobile additive manufacturing installation comprising:
   a main self-supporting frame which renders the installation transportable by road;
   a main manufacturing housing supported by the main self-supporting frame and closed in a leaktight manner by panels fixed to the main self-supporting frame;
   a main additive manufacturing machine installed inside the main manufacturing housing, the main additive manufacturing machine comprising a manufacturing chamber inside which is carried out an additive manufacturing process consisting of depositing additive manufacturing powder and fusing grains of the powder using a source of energy or of heat;
   a main inerting device configured to supply the manufacturing chamber of the main additive manufacturing machine with an inert gas and to capture the inert gas contaminated by fumes resulting from the additive manufacturing process inside the manufacturing chamber;
   a main circulation path provided in the main manufacturing housing along which an operator can circulate around the main additive manufacturing machine;

a main airlock for entry and exit of at least one operator, the main airlock being supported by the main self-supporting frame and closed in a leaktight manner by panels fixed to the main self-supporting frame, with an internal door between the main airlock and the main manufacturing housing and an external door between the main airlock and outside of the installation;
an auxiliary manufacturing housing connected in a leaktight manner to the main manufacturing housing;
an auxiliary additive manufacturing machine installed inside the auxiliary manufacturing housing;
an auxiliary self-supporting frame which supports the auxiliary manufacturing housing and which is independent of the main self-supporting frame, the auxiliary manufacturing housing being closed in a leaktight manner by panels fixed to the auxiliary self-supporting frame; and
an auxiliary circulation path provided in the auxiliary manufacturing housing along which an operator can circulate around the auxiliary additive manufacturing machine installed in the auxiliary manufacturing housing.

2. The mobile additive manufacturing installation according to claim 1, wherein two main additive manufacturing machines are installed inside the main manufacturing housing.

3. The mobile additive manufacturing installation according to claim 1, wherein two auxiliary additive manufacturing machines are installed inside the auxiliary manufacturing housing.

4. The mobile additive manufacturing installation according to claim 1, wherein there is more than one manufacturing chamber inside the main additive manufacturing machine.

5. The mobile additive manufacturing installation according to claim 1, wherein there is more than one auxiliary manufacturing housing.

6. The mobile additive manufacturing installation according to claim 1, wherein each of the main manufacturing housing and the auxiliary manufacturing housing comprises at least one door; and
wherein a junction corridor is installed between the door of the main manufacturing housing and the door of the auxiliary manufacturing housing.

7. The mobile additive manufacturing installation according to claim 1 further comprising:
an auxiliary inerting device configured to supply a manufacturing chamber of the auxiliary additive manufacturing machine with an inert gas and to capture fumes resulting from an additive manufacturing process inside the manufacturing chamber of the auxiliary additive manufacturing machine, the auxiliary inerting device being independent of the main inerting device.

8. The mobile additive manufacturing installation according to claim 7, wherein the main inerting device is located outside the main manufacturing housing and is supported by the main self-supporting frame, and
wherein the auxiliary inerting device is located outside the auxiliary manufacturing housing and is supported by the auxiliary self-supporting frame.

9. The mobile additive manufacturing installation according to claim 1 further comprising:
a main treatment device configured to treat the air circulating inside the main manufacturing housing; and
an auxiliary treatment device to assist the main treatment device in the treatment of the air circulating in the main manufacturing housing and in the auxiliary manufacturing housing, the auxiliary treatment device being independent of the main treatment device.

10. The mobile additive manufacturing installation according to claim 9, wherein the main treatment device is located outside the main manufacturing housing and is supported by the main self-supporting frame, and
wherein the auxiliary treatment device is located outside the auxiliary manufacturing housing and is supported by the auxiliary self-supporting frame.

11. The mobile additive manufacturing installation according to claim 9 further comprising:
a main electrical cabinet bringing together power and control circuits for the main treatment device, the main inerting device, and the main additive manufacturing machine; and
an auxiliary electrical cabinet bringing together power and control circuits for the auxiliary inerting device, the auxiliary treatment device, and the auxiliary additive manufacturing machine, the auxiliary electrical cabinet being independent of the main electrical cabinet.

12. The mobile additive manufacturing installation according to claim 11, wherein the main electrical cabinet is located outside the main manufacturing housing and is supported by the main self-supporting frame, and
wherein the auxiliary electrical cabinet is located outside the auxiliary manufacturing housing and is supported by the auxiliary self-supporting frame.

13. The mobile additive manufacturing installation according to claim 1 further comprising:
a main recovery device for recovery of waste waters and an auxiliary recovery device for recovery of waste waters, the auxiliary recovery device being independent of the main recovery device.

14. The mobile additive manufacturing installation according to claim 13, wherein the main recovery device is located outside the main manufacturing housing and is supported by the main self-supporting frame, and
wherein the auxiliary recovery device is located outside the auxiliary manufacturing housing and is supported by the auxiliary self-supporting frame.

15. The mobile additive manufacturing installation according to claim 1 further comprising:
an extension module for extension of a volume of the main manufacturing housing,
wherein the extension module is self-supporting but fixed to the main self-supporting frame, the extension module being provided opposite a location of the main additive manufacturing machine in the main manufacturing housing.

16. The mobile additive manufacturing installation according to claim 1 further comprising:
an auxiliary extension module for extension of a volume of the auxiliary manufacturing housing, the auxiliary extension module being self-supporting but fixed to the auxiliary self-supporting frame, the auxiliary extension module being provided opposite a location of the auxiliary additive manufacturing machine in the auxiliary manufacturing housing.

* * * * *